United States Patent
Hirabayashi et al.

(10) Patent No.: US 9,163,934 B2
(45) Date of Patent: Oct. 20, 2015

(54) GAP MEASUREMENT DEVICE

(71) Applicants: Harmonic Drive Systems Inc., Tokyo (JP); Satoshi Kiyono, Miyagi (JP)

(72) Inventors: Hideki Hirabayashi, Nagano (JP); Hiroki Hanaoka, Nagano (JP); Satoshi Kiyono, Miyagi (JP)

(73) Assignees: HARMONIC DRIVE SYSTEMS INC., Tokyo (JP); Satoshi Kiyono, Miyagi (JP)

( * ) Notice: Subject to any disclaimer, the term of this patent is extended or adjusted under 35 U.S.C. 154(b) by 0 days.

(21) Appl. No.: 14/279,313

(22) Filed: May 15, 2014

(65) Prior Publication Data

US 2014/0347679 A1    Nov. 27, 2014

(30) Foreign Application Priority Data

May 22, 2013 (JP) .................................. 2013-108223

(51) Int. Cl.
- *G01B 11/02* (2006.01)
- *G01B 11/14* (2006.01)
- *G01B 11/08* (2006.01)
- *G01B 11/10* (2006.01)

(52) U.S. Cl.
CPC ................ *G01B 11/14* (2013.01); *G01B 11/08* (2013.01); *G01B 11/105* (2013.01)

(58) Field of Classification Search
CPC .................... G01N 27/9046; G01N 33/48721; G01N 21/553; G01N 15/0656; G01N 2030/528; G01N 27/07; G01N 27/44791; G01N 30/0005; G01N 30/6069; G01N 30/6095; G01N 11/04; G01N 2021/8472; G01N 21/6428

See application file for complete search history.

(56) References Cited

U.S. PATENT DOCUMENTS

| | | | | |
|---|---|---|---|---|
| 4,666,303 A | * | 5/1987 | Pryor | 356/606 |
| 4,821,544 A | * | 4/1989 | Tamler et al. | 72/14.1 |
| 4,932,781 A | * | 6/1990 | Kuwayama | 356/505 |
| 5,504,596 A | * | 4/1996 | Goto et al. | 359/24 |
| 2008/0315092 A1 | * | 12/2008 | Kley | 250/307 |

FOREIGN PATENT DOCUMENTS

| | | | |
|---|---|---|---|
| DE | 3536374 | * | 5/1993 |
| JP | 2009-229312 A | | 10/2009 |
| JP | 2010-156630 A | | 7/2010 |

* cited by examiner

*Primary Examiner* — Michael P Stafira

(57) ABSTRACT

A gap measurement device 1 comprises a light source 5 for projecting light on a gap 3 to be measured, a lens optical system 6 for focusing on an imaging surface 7 a gap image 3A from light transmitted through the gap 3, and a light-receiving element 9 for receiving light of the gap image 3A formed on the imaging surface 7 of the lens optical system 6. A holed mask 8 provided with a light-transmitting hole 8a having a prescribed aperture size is arranged on the imaging surface 7, and the light-receiving element 9 receives the light of the gap image 3A via the hole 8a. A gap size at a point to be measured in an extended gap 3 can be measured by forming an image of the gap with the lens optical system 6 and placing the hole 8a of the holed mask 8 on the point to be measured on the imaging surface 7 of the lens optical system 6.

5 Claims, 3 Drawing Sheets

| | |
|---|---|
| 1 | GAP MEASUREMENT DEVICE |
| 2 | MEASURED SURFACE |
| 3 | GAP |
| 3A | GAP IMAGE |
| 4 | MEASUREMENT MASTER |
| 5 | LIGHT SOURCE |
| 6 | LENS OPTICAL SYSTEM |
| 6a | OPTICAL AXIS |
| 7 | IMAGING SURFACE |
| 8 | MASK |
| 8a | HOLE OF MASK |
| 9 | LIGHT-RECEIVING ELEMENT |
| 9a | LIGHT-RECEIVING PLANE |

| 1 | GAP MEASUREMENT DEVICE |
|---|---|
| 2 | MEASURED SURFACE |
| 3 | GAP |
| 3A | GAP IMAGE |
| 4 | MEASUREMENT MASTER |
| 5 | LIGHT SOURCE |
| 6 | LENS OPTICAL SYSTEM |
| 6a | OPTICAL AXIS |
| 7 | IMAGING SURFACE |
| 8 | MASK |
| 8a | HOLE OF MASK |
| 9 | LIGHT-RECEIVING ELEMENT |
| 9a | LIGHT-RECEIVING PLANE |

| | |
|---|---|
| 2 | MEASURED SURFACE |
| 3 | GAP |
| 3A | GAP IMAGE |
| 4 | MEASUREMENT MASTER |
| 6 | LENS OPTICAL SYSTEM |
| 6a | OPTICAL AXIS |
| 7 | IMAGING SURFACE |
| 8 | MASK |
| 8a | HOLE OF MASK |
| 9 | LIGHT-RECEIVING ELEMENT |
| 10 | UNIT |

A, B, C     POSITION OF GAP
A', B', C'    POSITION OF MASK

GAP MEASUREMENT DEVICE

FIELD OF THE INVENTION

The present invention relates to a gap measurement device using a "gap visualization method," in which the light of a gap image obtained by projecting light on a gap formed between a surface to be measured and a measurement master is received by a light-receiving element and a gap distance is measured on the basis of the quantity of the received light.

BACKGROUND ART

The inventors proposed such kind gap measurement device which uses a gap visualization method in patent documents 1 and 2.
  Patent Document 1: JP-A 2010-156630
  Patent Document 2: JP-A 2009-229312
  In a gap visualization method, it is sometimes necessary to measure the gap distance at a specific point in a gap extending in a prescribed direction (an extended gap). In this case, a method may be used in which a mask provided with a pinhole, window, or the like, is arranged proximally to the gap and light from a gap portion other than the object point is blocked. Or, a method may be used in which a point light source is placed on the specific object point proximal to the gap so that light from a gap portion on the periphery is not produced.
  However, with the former method which places the mask immediately after the gap, the light passing through the mask gets diffracted. One method for overcoming this drawback involves analyzing the diffraction pattern to learn the size of the gap, but there is a problem that the analysis is difficult. A situation also may arise in which it is difficult to place the mask proximally to the gap.
  With the latter method which uses a point light source, when the location to be measured is small, it may be difficult to direct the light emitted from the light source to the target location. Also in the case of a thick measured object, a design for diagonally directing the light source, or the like, is necessary, and a spatial constraint arises.

SUMMARY OF THE INVENTION

An object of the present invention is to provide a gap measurement device that is capable of receiving light from a specific point on an extended gap without the use of a mask positioned adjacent to the gap.
  Another object of the present invention is to provide a gap measurement device that allows measurement of a gap in two or three dimensions.
  In order to attain the abovementioned objects, the present invention provides a gap measurement device, comprising:
    a light source for projecting light on a gap to be measured;
    a lens optical system for forming in a prescribed position a gap image obtained by projecting light on the gap; and
    a light-receiving element for receiving the light of the gap image formed on an imaging surface of the lens optical system.
  It is desirable here that: a holed mask provided with a light-transmitting hole having a prescribed aperture size is arranged on the imaging surface; the size of the hole is greater than or equal to the thickness of the gap image in the thickness direction of the gap image; and the light-receiving element receives the light of the gap image via the hole.
  With the present invention, an image of an extended gap is focused on by the lens optical system and an aperture (a hole in a light-receiving plane of the light-receiving element or in the holed mask) is placed on a specific point on the imaging of the lens optical system, whereby only light from an object point on the gap (a position on the gap to be measured) is allowed to be received by the light-receiving element. This obviates having to arrange a mask having a pinhole, or the like immediately after the gap.
  In the present invention, the lens optical system can be configured with a light-collecting lens for converting light transmitted through the gap into parallel light, and an imaging lens for focusing the parallel light from the light-collecting lens on the imaging surface.
  According to this configuration, the object point on the gap can be narrowed to the diffraction limit of the lens optical system. The light-receiving element can thereby capture a small change of gap size with favorable precision as a change of quantity of light.
  Also by adopting this lens optical system, the lens optical system, the holed mask, and the light-receiving element can be formed integrally as a unit, and the unit can be moved two-dimensionally in directions in perpendicular to an optical axis of the lens optical system, or three-dimensionally in directions perpendicular to the optical axis and in a direction parallel to the optical axis. As a result, the gap measurement device of the present invention can be used for measuring complicated shapes including those of a helical gear and the like.
  Furthermore by adopting this lens optical system, the gap does not necessarily have to be in a focal position of the light-collecting lens (object lens). A light ray from the entirety of a minimally extended gap can be efficiently collected and focused into an image if the gap is proximal to the focal position.

MODE FOR CARRYING OUT THE INVENTION

Figure 1:
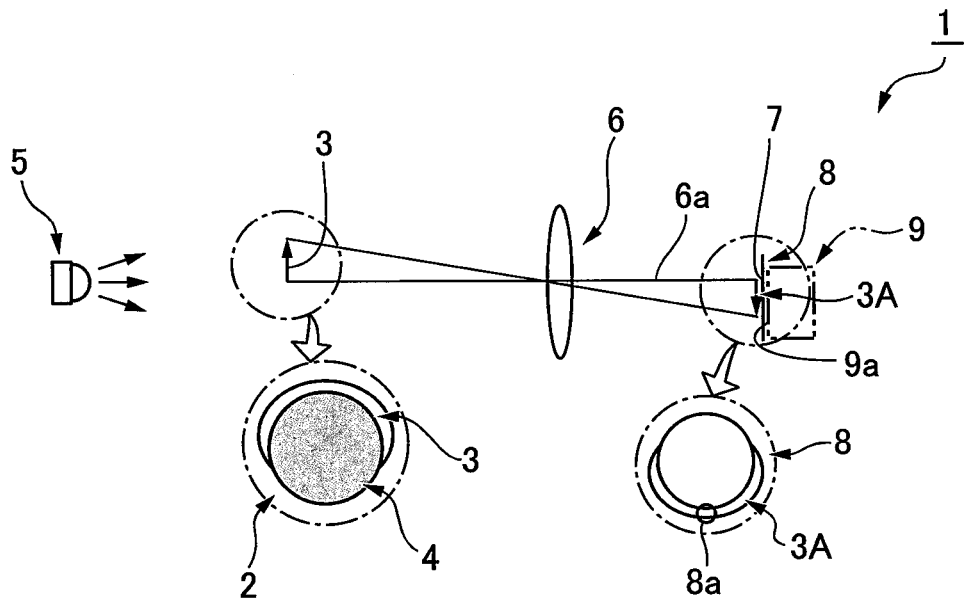
FIG. 1 is an explanatory diagram illustrating the basic configuration of a gap measurement device of the present invention.

An embodiment of a gap measurement device in which the present invention is applied is described below with reference to the drawings.
  FIG. 1 is an explanatory diagram illustrating the basic configuration of a gap measurement device in which the present invention is applied. The gap measurement device 1 has a measurement master 4 for forming a prescribed gap 3 together with an object of measurement on a measured surface (object surface) 2 of the object of measurement. The measurement master 4 is fabricated in advance in accordance with a shape of the object of measurement. An outline shape error, or the like, of the object of measurement on the measured surface 2 can be calculated by measuring a distance of the gap 3.
  The gap measurement device 1 has a light source 5 for projecting light from one side of the gap 3 and a lens optical system 6 to be arranged on the other side of the gap 3. The lens optical system 6 is a lens optical system for focusing a gap image 3A formed by projecting light on the gap 3 from the light source 5, on an imaging surface 7 in a prescribed position on an optical axis 6a.

The gap measurement device 1 also has a holed mask 8 arranged on the imaging surface 7, and a light-receiving element 9 for receiving light transmitted through a hole 8a in the holed mask 8. The hole 8a is, for example, a circular hole, and its size is greater than or equal to the thickness of the gap image 3A on the imaging surface 7. A light-receiving plane 9a on the light-receiving element 9 is arranged on the back side of the hole 8a. An optical fiber or other light-guiding member can be used to guide light transmitted through the hole 8a to the light-receiving plane 9a of the light-receiving element 9 in a remote position.

Figure 2:
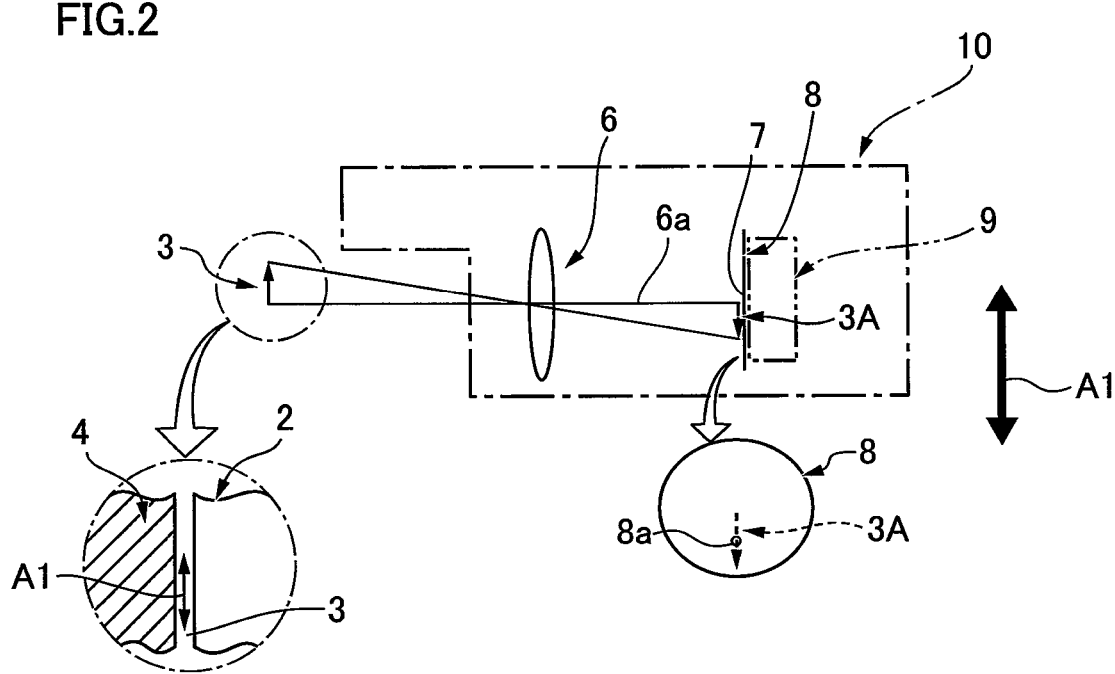
FIG. 2 is an explanatory diagram illustrating the configuration of a gap measurement device provided with a movable unit.

FIG. 2 is an explanatory diagram illustrating the configuration of a gap measurement device 1 in which parts on the light-receiving side are formed as a unit and are configured to be movable in directions perpendicular to the optical axis 6a. As illustrated, the lens optical system 6, the holed mask 8, and the light-receiving element 9, excluding the measurement master 4, are formed integrally as a unit 10. The unit 10 is mounted on a device stand (not shown), in a state being movable in directions perpendicular to the optical axis 6a of the lens optical system 6, and is movable on a perpendicular plane perpendicular to the optical axis 6a by a uniaxial drive mechanism (not shown).

For example, as illustrated in FIG. 2, the gap image 3A corresponding to the gap 3 formed by the measured surface 2 and the measurement master 4 is formed on the imaging surface 7. The position of the hole 8a of the holed mask 8 serves as a measurement point. When the unit 10 is moved following the gap image 3A as indicated by the arrow A1, the hole 8a also moves along the gap image 3A, and a quantity of received light on the measured point can be received by the light-receiving element 9. A gap size at the point to be measured can be measured thereby.

Figure 3:
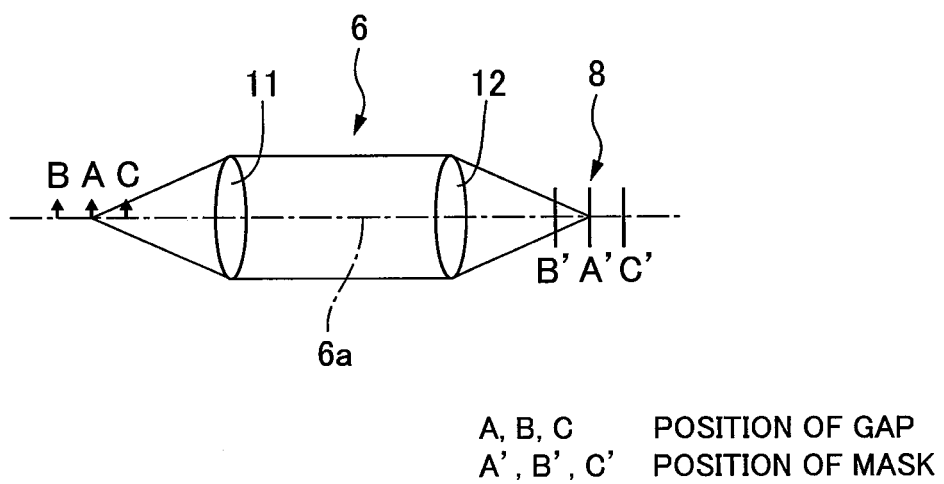
FIG. 3 is an explanatory diagram illustrating an example of the configuration of the lens optical system of the gap measurement device.

FIG. 3 is an explanatory diagram of the lens optical system 6. The lens optical system 6 is provided with a light-collecting lens 11 for converting light transmitted through the gap 3 into parallel light, and an imaging lens 12 for focusing the parallel light from the light-collecting lens 11 on the imaging surface 7. According to this configuration, a light ray from the entirety of a minimally extended gap can be efficiently collected and focused into an image. A gap on a measured surface 2 in different positions A, B, and C, for example, in the direction of the optical axis 6a can also be measured by moving the unit 10 along a direction of the optical axis 6a so that the mask 8 is positioned at A', B' and C' in accordance with the respective positions A, B and C.

The invention claimed is:

1. A gap measurement device, comprising:
a light source for projecting light on a measured surface extending perpendicular to an optical axis of the light source, wherein a gap, which is formed by an object and a measurement master and has an opening, is located within the measured surface, the opening extends on the measured surface, and the gap extends from the opening in parallel to the projecting direction of the light;
a lens optical system for forming a gap image at an imaging surface, wherein the imaging surface is on an opposite side of the measured surface which is opposite to a side of the light source; and
a light-receiving element which is provided on opposite side, receives the gap image formed on the imaging surface, and detects a quantity of the light, thereby measuring a size of the gap.

2. The gap measurement device according to claim 1, further comprising: a holed mask arranged on the imaging surface and provided with a light-transmitting hole having a prescribed aperture size, a size of the hole being greater than or equal to a thickness of the gap image in a thickness direction of the gap image; and the light-receiving element receiving the light of the gap image via the hole.

3. The gap measurement device according to claim 2, wherein the lens optical system is provided with a light-collecting lens for converting light transmitted through the gap into parallel light, and an imaging lens for focusing the parallel light from the light-collecting lens on the imaging surface.

4. The gap measurement device according to claim 3, wherein the holed mask is movable to a gap position on the imaging surface where a measurement is to be made in the gap image.

5. The gap measurement device according to claim 4, wherein: the lens optical system, the holed mask, and the light-receiving element are formed integrally as a unit; and the unit is movable two-dimensionally in directions perpendicular to the optical axis of the lens optical system, or three-dimensionally in directions perpendicular to the optical axis and in a direction parallel to the optical axis.

* * * * *